L. E. BROWN.
BAKING-PAN.
No. 178,105.  Patented May 30, 1876.
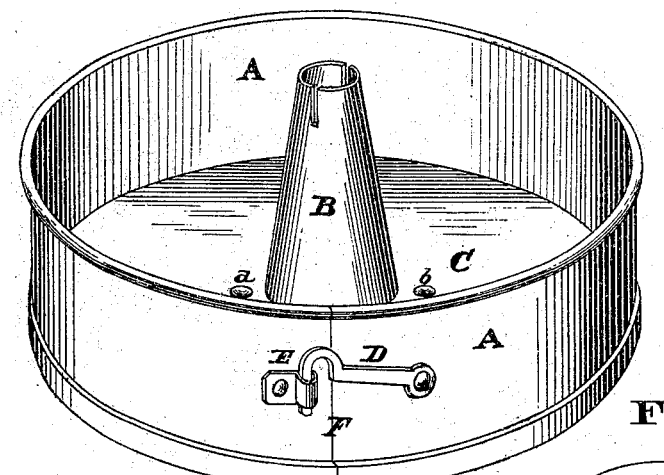
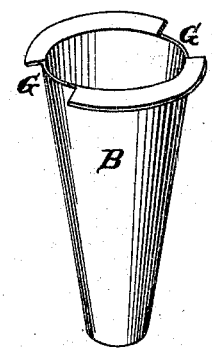
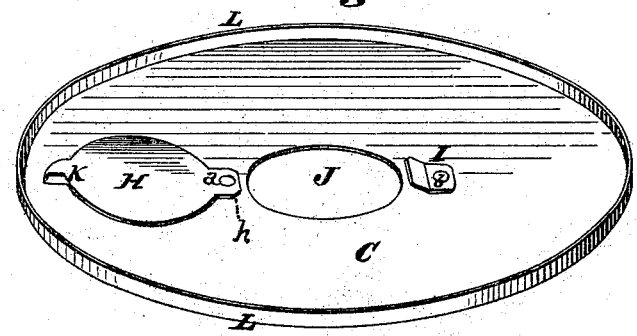
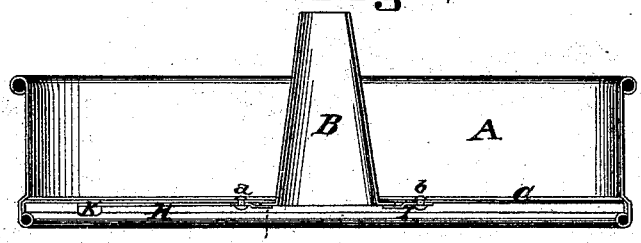
Attest
John O'Gara
J. H. Jeffrey
Inventor
Lewis E. Brown
by Wood & Boyd
Attorneys.

UNITED STATES PATENT OFFICE.

LEWIS E. BROWN, OF CINCINNATI, OHIO.

IMPROVEMENT IN BAKING-PANS.

Specification forming part of Letters Patent No. 178,105, dated May 30, 1876; application filed May 11, 1876.

*To all whom it may concern:*

Be it known that I, LEWIS E. BROWN, of Cincinnati, in the county of Hamilton and State of Ohio, have invented certain new and useful Improvements in Baking-Pans, of which the following is a specification:

The first part of the invention consists in making the center flue removable, and in providing a pivoted slide for covering the aperture left by the removal of the flue, so that the pan may be used either with or without it, and avoiding the use of an extra bottom.

The second part of the invention consists in so attaching the center flue to the bottom that it may be readily detached from above, by a partial turn, which, at the same time, loosens the tube from the material baked, and allows it to drop out without inverting the pan and without injury to the material baked.

Figure 1 is a perspective view of the pan, with the flue in position; Fig. 2, a perspective view of the bottom of the pan; Fig. 3, a perspective view of the flue inverted, and Fig. 4, a transverse section of the pan.

The invention is shown in connection with a pan, the bottom C of which is removable by means of the side A, being provided with a groove for it to rest in, from which it may be released by unloosening the clasp-fastening D E, but it may be used in connection with any other kind of a pan, although the form shown is preferable, because the safer way to remove the baked material is to first loosen the side A. J represents the aperture in the bottom; I, a clasp; H, a pivoted slide for covering the aperture J, and, when in the position shown in Fig. 2, has on a lug or clasp, $h$, projecting beyond the pivot $a$. When it is desired to use the pan without the center funnel, H is turned until the end K engages under I, when it will be securely held, and so covering the aperture that the pan may be used without adding a secondary bottom. The flue B is shown in the form of an inverted funnel, but may be of any desired form. It is provided on its lower end with a flange, having portions cut away, as shown at G G, Fig. 3. It is inserted into the aperture J from below until the flange strikes the bottom, when it is turned partially around, so that the flanges will engage between the clasps I and $h$ and the bottom.

To remove the funnel after the baking is complete and while the pan is warm, it is only necessary to insert the blade of a knife or any other instrument into the slots at the top, shown in Fig. 1, and give it a partial turn, so as to release the flanges, and as this movement will force it from the material baked, it will drop out, thus avoiding the necessity of inverting or raising the pan, and all risk of soiling or injuring the material baked.

I claim—

1. A baking-pan, having an aperture in its bottom, with lugs $h$ and clasp I, in combination with the cover B, having the slotted flange G for removing and securing the cover, as set forth.

2. A bake-pan, having an aperture in its bottom and a clasp, I, in combination with the pivoted slide H, for operation in connection with the flanged center-flue B, having the slots G, substantially as described, and for the object specified.

In testimony whereof I have hereunto set my hand this 5th day of May, 1876.

LEWIS E. BROWN.

Witnesses:
EDWARD BOYE,
JOHN O'GARA.